Sept. 10, 1935.   H. CHIREIX   2,013,799
MEANS FOR MEASURING FREQUENCIES
Filed Nov. 14, 1930
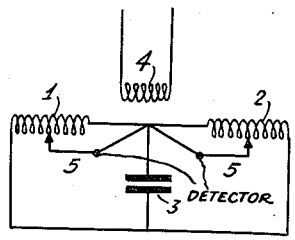
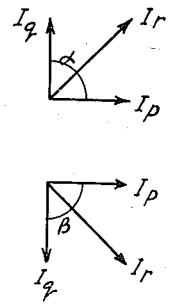
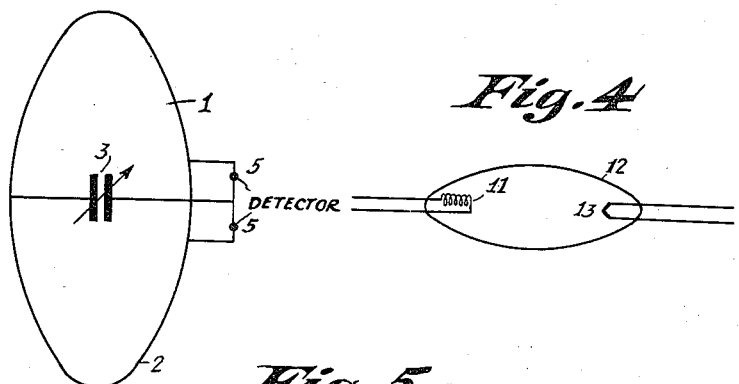
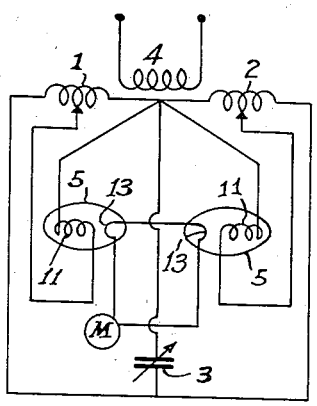
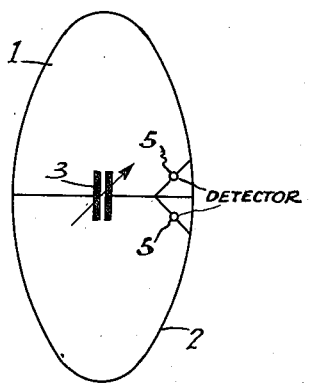
INVENTOR
HENRI CHIREIX
BY *H. S. Grover*
ATTORNEY Patented Sept. 10, 1935

2,013,799

UNITED STATES PATENT OFFICE 2,013,799

MEANS FOR MEASURING FREQUENCIES

Henri Chireix, Paris, France, assignor to Compagnie Generale de Telegraphie Sans Fil, Paris, France, a corporation of France Application November 14, 1930, Serial No. 495,581
In France November 15, 1929

4 Claims. (Cl. 250—39)

The present invention has as its object the construction of a frequency meter of high precision for high frequency currents. This frequency meter, capable of detecting frequency variations of the order of one hundred-thousandth for instance and even less, may, on the other hand, be used as the principal element of a regulator of high precision in the manner that it may control, by its indications, the very generator whose frequency it is desired to regulate.

The high frequency meters or wave meters, constructed by the prior art, usually have the form of an oscillating or periodic circuit which is tuned to the frequency to be measured, and involves detecting the resonance in the measuring circuit by means of the reading of an intensity maximum. A mode of operation of this type is not very precise as such, due to the fact that the amplitude of the current in the oscillating circuit varies little in the immediate vicinity of the resonance due to the smallness of the reactance value which appears opposite the resistance value.

The method according to the present invention is much more precise. The present method consists in favoring the phase variations to which the current induced in the circuit tuned to the vicinity of the resonance of this circuit is subjected, with respect to the frequency to be measured. In fact, these phase variations are at the maximum at this moment.

The novel features of my invention have been set forth more particularly in the claims appended hereto. The nature of the invention and the operation thereof will be understood from the following detailed description thereof and therefrom when read in connection with the drawing throughout which like reference numerals indicate like parts and in which:

Figure 1 shows a practical application of my novel frequency meter;

Figure 2 shows the relation between the currents induced in the various portions of the meter circuit of Figure 1; while, Figures 1a, 3, 4, and 5 show modifications of the arrangement of Figure 1.

An embodiment for the practical application of the method is given, by way of example, by the circuit arrangement of Figure 1. In this arrangement two self-inductances 1 and 2, preferably but not necessarily equal, are both branched off a condenser 3. The ensemble is energized by a coil 4 connected to the source of the current whose frequency is to be measured.

The set 1, 2, 3 may be considered as realizing two circuits, one formed by the two inductances 1 and 2, connected in series and, consequently, aperiodic, the other formed by the two inductances 1 and 2, connected in parallel, the ensemble being coupled in series with condenser 3. This circuit is evidently periodic.

If it is assumed that the coefficients of induction of the coil 4 with the coils 1 and 2 are of the same sign and proportional to these inductances (in other words, equal if the inductances are equal), it is easy to see that no current will flow in the condenser and that only the aperiodic circuit formed by 1 and 2 in series will be traversed by a current in quadrature with the induced electromotive force. If subsequently one of the coefficients of induction is slightly increased with respect to the other, for instance by displacing slightly the coil 4, the two plates of the condenser cease to be equipotential and there will be superimposed, in the self-inductances 1 and 2, on the current previously in quadrature, a current originating from the periodic or tuned current and being, besides, co-phasal with the electromotive force induced at the exact resonance of the circuit. The amplitude of this current is otherwise proportional to the nonequilibrium of the induced electromotive forces. This disaccord of the induced electromotive forces is regulated preferably in order to produce in the inductances 1 and 2 a co-phasal current $I_p$ (see Figure 2), practically equal to the current in quadrature $I_q$ which, besides, will require only a very slight disaccord of the electromotive forces if the elements 1, 2, 3 are subject to small losses only.

The diagram of Figure 2 gives the resulting currents $I_r$ and $I'_r$ in the self-inductances 1 and 2. In other words, $I_r=I_q+I_p$ and $I'_r=I_q-I_p$. The calculation and deduction show that the currents $I_r$ and $I'_r$, which are equal to the exact resonance of the periodic circuit, cease to be so as soon as a disaccord intervenes since such a disaccord has the effect of turning the vectors $I_p$ of the Figure 2 by a certain angle and, consequently, to decrease, for instance the angle $\alpha$ between the vectors $I_q$ and $I_p$ representing the cophasal and quadrature currents in inductance 1 if $\beta$, the angle between the vectors $I_q$ and $I_p$ representing the cophasal and quadrature currents in inductance 2, increases or vice versa.

If then, as shown in Figure 1, two detectors 5 are shunted on a part of the self-inductances 1, 2, the difference $I'_r-I_r$ may be revealed. By detector is understood in this case any element as means for transforming the high frequency current. Such a detector may consist, for instance, of a thermo-electric couple, a crystal detector, a tube with several electrodes and the like. A particularly convenient arrangement consists, for instance, in connecting two thermo-couples in such manner, the condenser being completely detuned, that the electromotive forces, produced by these couples, oppose one another in an indicating apparatus. These electromotive forces still oppose one another at the exact resonance of the circuit and give a differential electromotive force in the vicinity of the resonances, this electromotive force changing in its sign with the sign of the disaccord.

Besides, the strict calculation shows that the differential electromotive force, expressed in percent of the average electromotive force, of each of the couples is:

$$4\epsilon S\%$$

where $\epsilon$ designates the detuning in % and S the ratio of the reactive power of the tuned circuit to its losses. $\epsilon$ the detuning in percentage equals $$\frac{\omega - \omega_0}{\omega_0}$$

where $\omega$ equals the frequency of the exciting source and $\omega_0$ equals the tuning frequency of the circuit. The reactive power equals $\omega_0$ times L times $I^2$ and the losses equal $RI^2$, from whence it follows that S equals $\omega_0$ times $$\frac{L}{R}$$

where L denotes the inductance of the circuit and R is its ohmic resistance.

Thus, for instance, a circuit for which S=1000, would give a differential electromotive force equal to 4% for a detuning of 1/100000 (one hundred-thousandth).

These numbers, be it well understood, are exact only for a detector according to the law of squares and for equal currents $I_p$ and $I_q$.

The calculation shows further that if $I_p$ and $I_q$ are unequal, only the sensitivity of the measurement is affected but not its exactitude and at that, very little if the ratio $I_p/I_q$ is chosen, for instance, between 0.7 and 1.4.

The calculation likewise shows that the self-inductances 1 and 2 may be inductively coupled together.

Finally, the exploring and energizing coil 4 may be eliminated entirely, if the flux, collected by the coils 1 and 2 from any field, is regulated as to effect on the inductances 1 and 2 as previously mentioned.

If the invention is to be used to detect frequency variations in waves of very high frequency, the arrangement of Figure 3 is recommended, where inductance 4 is omitted, the flux is collected by 1 and 2 and the inductances 1 and 2 are combined in a single frame. Here the condenser 3 is branched in quite marked manner between two points of this frame, diametrically opposed.

Finally, Figure 4 shows a form of construction of a thermo-couple which may be advantageously made use of for the detectors 5 of the invention. The heating spiral 11 is, for instance, wound around a thin stem of quartz and disposed in the focal point of a reflecting ellipsoid 12, whose other focal point is occupied by the thermo-electric contact 13. Where thermo-couples, as shown in Figure 4, are used as detectors in the arrangement of Figure 1, the arrangement will be as shown in Figure 1a. Here the detectors 5 each comprise a thermoelectric contact 13 and a heating spiral 11 enclosed in a reflecting ellipsoid 12. The variations in frequency will appear in the circuit of the thermo-electric contacts 13 and will be indicated in the measuring device M differentially connected in the circuit of contacts 13. The device M, in addition to being the frequency indicating means, may include means for regulating the frequency appearing in 4.

The sensitivity may be regulated by moving any of the elements. In the case where this frequency meter is to be used as regulator, the differential potential, collected at the terminals of the detectors, may be amplified, for instance, by a tube amplifier and this amplified potential used for the control of the generator to be regulated.

Without exceeding the scope of the invention, which consists in its essentials in generating in a first line two currents of adjacent amplitudes, one with a phase which is variable with the frequency, the other with fixed phase and leading the resonance by 90°; and in a second line, likewise two currents, one with a phase variable with the frequency, the other with fixed phase and lagging behind the resonance by 90°, a certain number of variants may be conceived.

For instance, the branch 3 may also include the inductance.

The branches 1 and 2 may comprise condensers. The detectors may be connected in different manner, for instance as shown in Figure 5 where the aperiodic circuit is limited to a coil or loop bridged by a branch containing the condenser 3. The detectors 5 are connected between spaced points on the loop adjacent to the point of connection of the branch circuit and to a point on said branch as shown.

Having thus described my invention, I claim:

1. A frequency meter comprising an aperiodic circuit including two conductors, a tuned circuit including, a condenser and said conductors, each of said conductors being common to the aperiodic and the tuned circuit, means to induce in the first conductor a current of a phase variable with the frequency and another current of fixed phase leading by an angle of 90 degrees with reference to the potential inducing the said current of variable phase, and to induce in the second conductor a current of a phase variable with the frequency and another current of fixed phase lagging by 90 degrees in reference to the potential inducing the said current of variable phase, means adapted to collect and detect the currents of each of the said conductors, said means shunting a part of each of the conductors, and indicating means coupled with the detection means.

2. Apparatus responsive to frequency variations comprising an aperiodic circuit including two conductors, a tuned circuit including a condenser shunting said conductors, each conductor being common to the aperiodic circuit and to the tuned circuit, a source of excitation placed a little asymmetrically with reference to the two conductors and coupled to these conductors to induce current therein, means for collecting and detecting the currents in each of the said conductors, said means shunting part of each of said conductors, and indicating means connected with both detecting means.

3. Apparatus responsive to frequency variations comprising a closed circuit having an inductive impedance, a branch circuit bridging this closed circuit, said branch circuit containing a capacitive reactance, two detectors connected on the one hand with the said branch circuit and on the other hand with two points of the closed circuit situated upon both sides of the connecting point between the said branch circuit and the closed circuit, and indicating means disposed in the output circuits of the said detectors.

4. Apparatus responsive to frequency variations comprising a loop, a branch containing a condenser bridging the loop, two detectors each connected on the one hand with the said branch and on the other hand with two points of the loop located upon both sides of the junction point between the loop and the branch of the condenser, and indicating means disposed in the output circuits of the said detectors.

HENRI CHIREIX.